May 14, 1935. C. W. VOGT 2,001,477
FROZEN COMESTIBLE PACKAGE
Original Filed Jan. 9, 1932
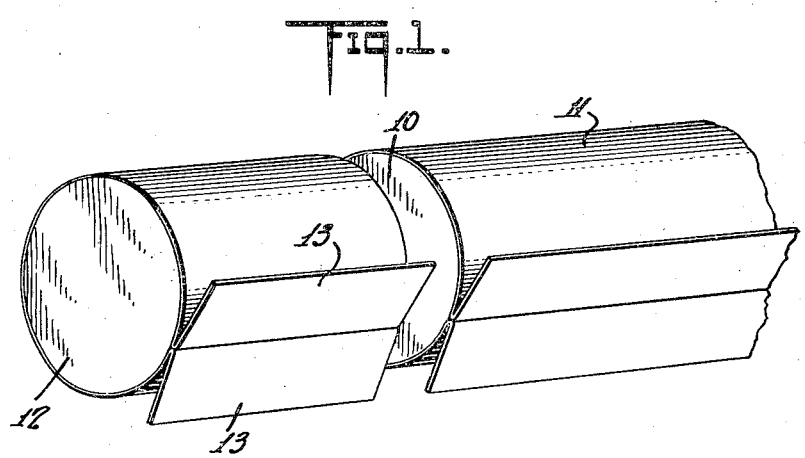
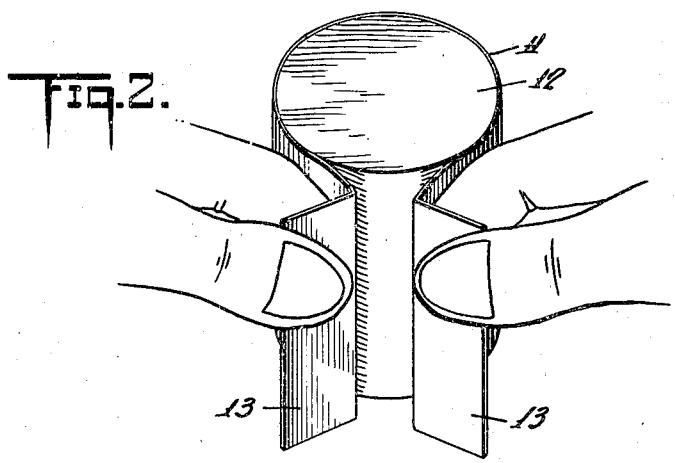
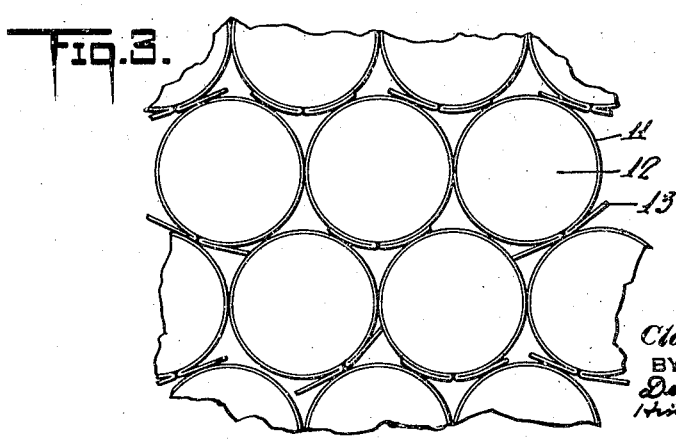
INVENTOR
Clarence W. Vogt
BY
ATTORNEYS Patented May 14, 1935

2,001,477

UNITED STATES PATENT OFFICE 2,001,477

FROZEN COMESTIBLE PACKAGE

Clarence W. Vogt, Louisville, Ky., assignor, by mesne assignments, to Vogt Processes Incorporated, Louisville, Ky., a corporation of Delaware Original application January 9, 1932, Serial No. 585,745. Divided and this application April 22, 1933, Serial No. 667,329

5 Claims. (Cl. 206—56)

In the ordinary method of dispensing ice cream, individual portions are obtained by dipping into a large can of ice cream and scraping with the dipper until the latter is filled and then depositing the scooped out portion into the dish or container in which it is delivered to the customer. This operation is objectionable in many respects including the time and physical effort required, the loss of ice cream which is not scraped from the wall of the can, the lack of uniformity of the served portions, the loss of overrun due to dipping, the melting of the ice cream due to the insertion of the warm dipper, the contamination from the dipper due to failure to thoroughly clean the latter between successive uses, and the contamination of the ice cream due to foreign matter dropping into the can.

It has been proposed to freeze ice cream in individual portions in paper cups or the like, but ice cream in this form is usually eaten directly from the container and is not readily adaptable for use in cones, in soda water or sundaes, or for serving ordinary portions, due to the difficulty in removing the ice cream as a body from the cup or other container in which it is frozen.

It has been proposed to fill long paper tubes with the ice cream and cut the tube and ice cream into sections to form individual portions, but this requires the forcing of the body of ice cream endwise out of the cylindrical paper casing at the time the cream is to be consumed.

The main objects of my invention are to overcome all of the objections heretofore pointed out in connection with the methods of serving ice cream previously employed, to insure uniform portions to each customer, to reduce the liability of contamination, to avoid dipping losses, to avoid shrinkage from dipping operations, to maintain the full original overrun, to permit the ice cream to be served in softer and more palatable form, and to permit quicker and more efficient dispensing.

A further object of my invention is to provide a small package of ice cream of sufficient size to be dispensed as an individual portion and of such form as to permit it to be served in dishes, soda glasses, cones or the like, to permit of its ready packaging in bundles or in containers for storage and transportation, and to permit the wrapper to be very easily and quickly removed when the ice cream is served.

In forming my improved individual service portions the ice cream may be extruded from the freezer and continuously delivered in a partially frozen or soft form and encased in paper or other non-edible sheet material continuously delivered from a roll and folded to progressively form a tube or casing within which it is enclosed during the hardening operation and during shipment and storage.

The continuous production and partial freezing of the ice cream may be accomplished by the use of a continuous freezer which thoroughly incorporates the desired amount of air and continuously delivers the ice cream as a soft bar or rod. For instance, I may use the type of apparatus described and broadly claimed in my prior Patents 1,783,864, 1,783,865, 1,783,866, 1,783,867, issued Dec. 2, 1930, and 1,847,149, issued Mar. 1, 1932, or my copending application Serial No. 602,157, filed March 31, 1932.

The continuously delivered, aerated and partially frozen ice cream may be encased in the wrapper and may be hardened therein and then cut into sections by mechanism of the type disclosed and broadly claimed in my prior Patents 1,810,740, 1,810,863 and 1,810,864, issued June 16, 1931.

The bar of ice cream so continuously produced and encased is preferably of such cross-sectional form and size and the hardened bar cut into sections of such length that the sections are of suitable shape and volume for use and sale as individual service portions. These portions may be assembled in larger packages or containers as disclosed in my copending application Serial No. 585,745 filed January 9, 1932.

The individual portions have the wrapping around the periphery but not across the ends and the wrapping does not form a closed integral tube but provides an excess of wrapping material bent to form tabs which may be manually grasped to peel or unroll the wrapper from the body of ice cream, leaving the latter free for service in a cone, dish, soda water glass or the like.

In the particular form of the invention illustrated herein, the wrapping is formed by a strip of paper or other sheet material having a width somewhat in excess of the periphery of the body of ice cream. This strip extends completely around the body until the two portions of the strip near the edges thereof abut and the excess afforded by the excess width of the strip is folded back to provide a pair of manually graspable tabs. These tabs may be pulled in opposite directions away from each other to peel the wrapper from the ice cream and let the body of ice cream drop into the dish or other container without the use of any tools and without the necessity for or liability of the dispenser touching the ice cream itself. The unwrapping action is a very simple one which may in some instances be performed with one hand. Thus the ice cream may be more promptly served in a more sanitary manner than has heretofore been possible.

The block of ice cream is preferably of cylindrical form to facilitate the peeling or stripping off of the wrapper. Such form also permits the block to be supported on its flat end on a dish or to be inserted into the mouth of a conventional ice cream cone, or to be dropped endwise into an ordinary size soda water glass. The cylindrical form also facilitates the assembly of a plurality of the blocks on end in a larger package or container and thus automatically affording spaces between them which will permit the fingers to be inserted between contiguous blocks to pick up any particular block and to readily grasp the tabs which project therefrom. The successive superimposed layers of blocks in the large package may be separated by thin sheets of paper or sheet material sealing the ends of the block during shipment and storage.

By freezing the ice cream very rapidly in the primary freezer, the air incorporated therein during such freezing or previously dissolved therein under pressure is in extremely minute bubbles or in solution, the ice crystals are very minute, there is less tendency of sandiness from separated particles of serum solids, the ice cream is smoother, and is more resistant to heat changes. It melts more slowly when removed from the cabinet and exposed to room temperature. Thus it is not necessary to maintain the dispensing cabinet at as low a temperature as is the usual practice where the ice cream is stored in bulk in cans, and the ice cream may be served at a little higher temperature and a little softer so that the flavor is more pronounced. Furthermore, it is not necessary to use artificial binders such as gelatin or the like, in the mix.

The present application is a continuation in part of my application Serial No. 625,316 filed July 28, 1932, which became Patent No. 1,906,183, and is a division of application Serial No. 585,745. The present application is concerned with generic claims to the package and with specific claims to the form here illustrated.

The invention may be more fully understood from the following description in connection with the accompanying drawing wherein:—

Fig. 1 is a perspective view of a portion of a long wrapped bar of the ice cream with an individual portion cut from the end thereof, Fig. 2 is a perspective view showing one method by which the wrapper may be manually peeled off, and Fig. 3 is a fragmentary top plan view showing one layer of individual ice cream portions assembled for shipment and storage.

In the production of the individual service units, the partially frozen ice cream with the desired and regulated amount of air incorporated therein is delivered as a continuously formed rod or bar 10, and at the same time paper is delivered from a roll and bent to form the enclosing casing 11. One general type of mechanism which may be used for accomplishing this result is disclosed and claimed in my copending application Serial No. 628,322, filed August 11, 1932.

The bars are cut into long sections and pass through a hardening chamber in which the final freezing operation takes place. These bars may then be cut into short sections to form the individual service portions, and such portions are packed in suitable containers or packages, for instance of the type shown in my copending application Serial No. 585,745. For cutting and packaging these portions one may employ apparatus of the general type disclosed and claimed in my copending application Serial No. 658,264, filed February 24, 1933.

The bar is preferably cylindrical in form and merely as an example it may be 1⅞ inches in diameter and cut into sections approximately 1¾ inches long so that the ice cream in about fifty of these individual portions would be equivalent to one gallon. Each service portion thus includes a cylindrical block of ice cream 12. The wrapping material 11 is delivered in one or more rolls and then folded so that the single strip or plurality of wrapper strips utilized, cooperatively encase the bar. In the specific form of the invention herein illustrated a single strip of wrapping material is used and this strip is of a width sufficiently in excess of the circumference of the bar, to be folded completely around the bar and having its edges turned outwardly to provide finger receiving tab portions 13 adapted to be manually grasped in order to peel the wrapper from the ice cream block.

In accordance with the illustrated form of the invention the wrapper is first folded completely around the bar and then along the line where the two portions of the wrapper meet, the wrapper is creased and the projecting edges are folded outwardly in opposite directions to provide the tabs or extensions 13.

As indicated in Fig. 1, when the folding operation is completed, the tabs are substantially tangential to the roll or at least they stand out from the roll sufficiently far so that they may be manually grasped. This relation of the tabs to the wrapped roll is mentioned because I have found it more preferable than folding the tabs back against the roll and making them more difficult to get hold of when unwrapping the individual portions of ice cream.

Fig. 3 shows the manner in which a number of these individual service portions are arranged within a container, this view being a broken sectional plan view looking down upon one layer of the individual service portions. As above suggested any suitable number of layers of such portions may be superimposed one upon the other with paper spacers between them.

The distinct advantage of using cylindrical blocks is apparent from Fig. 3 where it will be noted that there is adequate space between each service portion and its neighbors to permit convenient insertion of the thumb and forefinger into spaces at diametrically opposite portions of the block and convenient lifting out of an individual service portion.

Fig. 2 illustrates the convenient manner in which the tabs 13 may be grasped to unpeel the wrapper from the ice cream and drop the latter into a dish, or glass or cone. This roll is unwrapped by simply grasping the tabs, one in each hand, and pulling in opposite directions, the fingers of the dispenser never contacting with the ice cream either during removal of package from the large container or during unpeeling of the wrapper.

Although I have only disclosed a wrapper formed of a single strip, two or more strips may be used, such a construction being specifically claimed in my Patent 1,906,183.

I have described my invention as applied to ice cream, but it will, of course, be obvious that it is equally applicable to other analogous types of frozen confections which are liquid at room temperature, for instance, sherbet, water ice and the like, or for jellies.

I have described the package as an individual service portion, but it will be obvious that by appropriate change of proportions of the forming mechanism, the portion may have larger diameter and greater length, and the portions may be equivalent to half pints, pints or other standard sized units.

Having thus described my invention, what I claim as new and desire to secure by Letters Patent is:—

1. A new article of manufacture, comprising a substantially solid block of ice cream or the like, and a paper wrapper of greater length than the perimeter of the block and wrapped completely therearound, the two ends of the wrapper being folded away from each other and in opposite directions to form a pair of manually graspable spaced tabs.

2. A new article of manufacture, comprising a block of ice cream or the like, and a paper wrapper of a width equal to the length of said block and of greater length than the periphery of the block and wrapped completely therearound, the two end portions of the wrapper being of substantially uniform width throughout the length of said block and folded away from each other in opposite directions to form a pair of manually graspable spaced tabs adapted to be pulled in opposite directions to entirely remove the wrapper.

3. A new article of manufacture, comprising a substantially cylindrical block of ice cream or the like having a wrapper of a width equal to the length of said block and of greater length than the periphery of the block and wrapped completely therearound, the end portion of the wrapper being entirely out of contact with the block, of a substantially uniform width throughout the length of the block, and sufficiently wide to form an easily graspable section which upon being pulled away from the block effects a complete removal of the wrapper by progressive peeling around the periphery.

4. As a new article of manufacture a substantially cylindrical bar of frozen comestible which is liquid at body temperature, said bar having a wrapper of sheet material of a length equal to the length of the bar and covering the entire peripheral surface of said bar, said wrapper having edge portions forming flanges extending throughout the length of said bar, and said bar and said wrapper being adapted to be cut transversely into individual sections each having its ends uncovered, and the flange portions of each section forming finger tabs of the same length as the section and adapted to be pulled in opposite directions to peel the wrapper from the periphery of the section.

5. As a new article of manufacture, a substantially cylindrical bar of frozen comestible which is liquid at body temperature, said bar having a wrapper of sheet material covering the entire peripheral surface of said bar, said wrapper having at least one edge portion projecting outwardly from said periphery, and said bar and said wrapper being adapted to be cut transversely into individual sections, each having its ends uncovered, and an outwardly projecting edge of each section forming a finger tab of the same length as the section and adapted to be grasped to peel the wrapper from the periphery of the section.

CLARENCE W. VOGT.